Jan. 20, 1925.

1,523,623

D. ALTMAN

TIRE PROTECTOR

Filed May 4, 1923

Inventor
David Altman,
By L. Richard Paris,
Attorney

Patented Jan. 20, 1925.

1,523,623

UNITED STATES PATENT OFFICE.

DAVID ALTMAN, OF BALTIMORE, MARYLAND.

TIRE PROTECTOR.

Application filed May 4, 1923. Serial No. 636,663.

*To all whom it may concern:*

Be it known that I, DAVID ALTMAN, a citizen of Russia, and resident of Baltimore, in the State of Maryland, have invented a new and useful Tire Protector, of which the following is a specification.

It is the object of this invention to provide a device which may be disposed in front of and in the path of each of the front wheels of any vehicle which have rubber tires. The device is attached to the hubs of the wheels and serves to clear the path of the wheel of any obstruction which is likely to puncture or otherwise injure the tire. The device is provided with a magnet which travels close to the surface of the road and picks up such objects as nails or other pieces of iron and the like, and the device is also provided with mechanical means for clearing the path of other movable objects.

Figure 1:
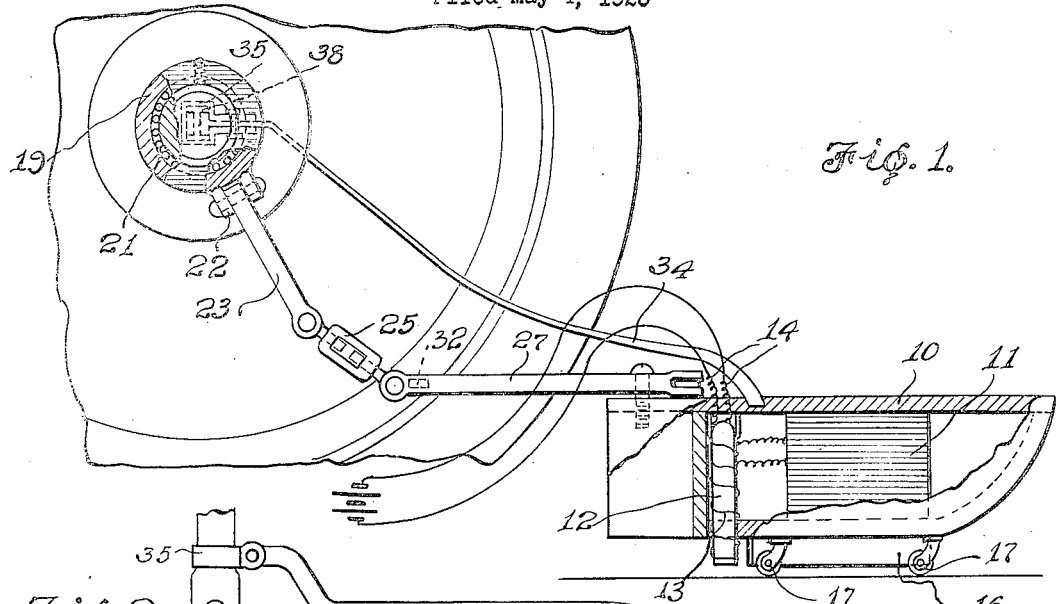
Figure 2:
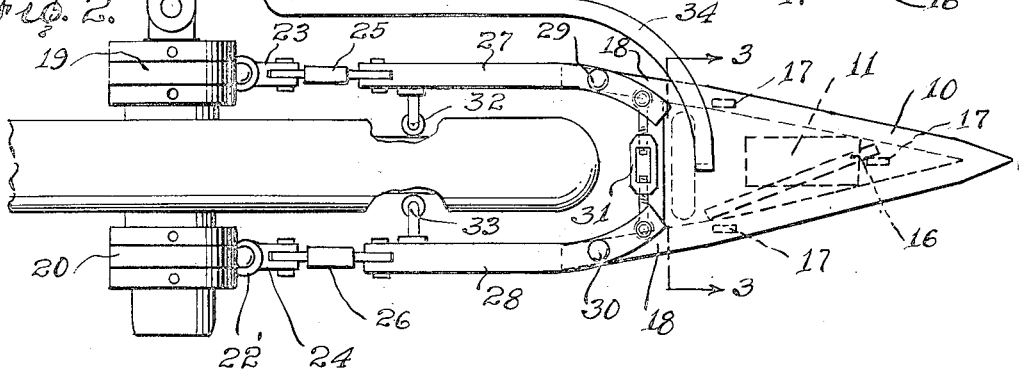
Figure 4:
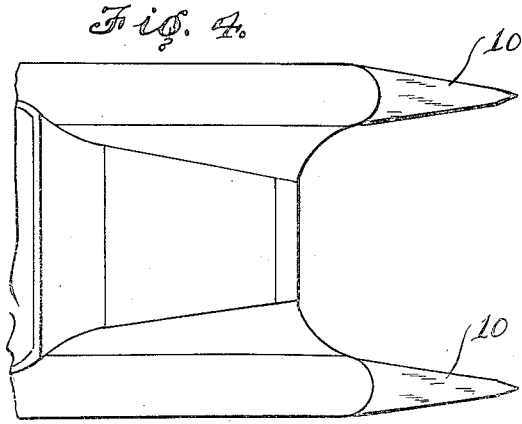
Figure 3:
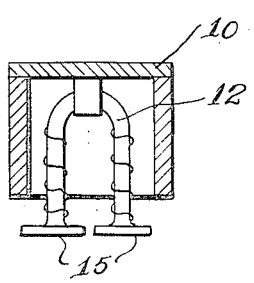

Fig. 1 is a side view of the device attached to a wheel. Fig. 2 shows a plan view of the same. Fig. 3 is a section on line 3—3 of Fig. 2; and Fig. 4 is a plan view of the forward part of an automobile with the tire protector attached to the two front wheels.

The tire protector consists of a casing 10, having the operating elements mounted therein and of means for attaching the casing in the proper operative relation to the wheel. The casing may have mounted therein a source of electric current 11 and an electromagnet 12. The winding 13 of the electromagnet may be connected to the source of current 11, or by means of wires 14 it may be connected to the automobile storage battery. When the winding obtains its energizing current from the automobile battery the cell 11 may be entirely dispensed with. The pole faces 15 of the electromagnet 12 are enlarged as shown in Fig. 3, project below the lower face of the casing and are disposed so as to travel parallel to the surface of the road. The lower face of the casing has mounted thereon a deflecting board 16 disposed at an angle to the path of travel of the vehicle. This board serves to deflect small objects on the road and thus minimizes the chances for puncturing the tire. Universally mounted roller casters 17 are attached to the lower face of the box.

The side plates of the casing have portions 18 which project rearwardly. The means for maintaining the casing in operative relation to the wheel and tire consist of two sets of links each attached at one end to the hub of the wheel and at the other end to the corresponding portion 18. Collars 19 and 20 are mounted on the hub on each side of the wheel in rotative relation to said hub by means of the ball bearings 21. The links 23 and 24 are pivotally attached to the forked lugs 22 and 22' respectively, the lugs being integral with the corresponding collar 19 or 20. The turnbuckles 25 and 26 are pivotally attached at one end to the links 23, 24 respectively and at the other end to the links 27, 28. After the device is assembled and installed the attachment between the said turnbuckles and the said links may be properly adjusted and tightened so as to maintain the angular relation between the links fixed. Links 27, 28 are curved toward each other at their forward ends and are pivotally mounted on the rearward portions 18 of the casing at points 29 and 30 respectively. At their free ends the links 27, 28 are connected by turnbuckles 31. Universally rotating rollers 32 and 33 are mounted on the links 27, 28. These rollers ride on the rim of the wheel and aid in positioning the links with relation to the wheel.

In order to minimize the vibration of the casing a leaf spring 34 is provided, which is attached to the front axle of the vehicle by means of a collar 35. The free end of the spring bears on the casing.

It will be noted that my device turns with the wheel and always travels in the same direction as the wheel.

The casing is so designed and shaped that in case the road is covered with snow the casing will plow through the snow and with the aid of the deflecting board the snow will be cleared from the path of the wheels, thus obviating the use of tire chains and the like.

I claim:

1. A device for removing movable obstructions from the path of a wheel of a vehicle comprising a magnet, a deflecting board, and means mounted on the hub of the wheel for disposing said magnet and deflecting board in the path of the wheel.

2. A tire guarding device comprising a casing, a magnet mounted within said casing, the poles of said magnet projecting below the lower face of said casing, means for disposing said casing in the path of a wheel, said means forking the wheel and adjustable to the size of the wheel, and yielding means for minimizing the vibration of the casing and a deflecting board attached to the lower face of said casing at an angle with relation to the path of the wheel whereby movable obstructions will be deflected from the path of the wheel in a direction at an angle to the path of the wheel.

3. A tire guarding device comprising a casing, a magnet mounted within said casing, the poles of the magnet projecting below the lower face of the casing, and a deflecting board attached to the lower face of the said casing, said board being disposed at an angle to the path of the wheel whereby movable obstructions will be deflected from the path of the wheel in a direction at an angle to the path of the wheel.

In testimony whereof I hereunto affix my signature.

DAVID ALTMAN.